July 9, 1957

D. GAST 2,798,504

SEPTIC TANK LINE INSPECTING DEVICE

Filed Nov. 4, 1954

Dwight Gast
INVENTOR.

BY *[signatures]*
Attorneys

United States Patent Office 2,798,504
Patented July 9, 1957

2,798,504

SEPTIC TANK LINE INSPECTING DEVICE

Dwight Gast, Toledo, Ohio

Application November 4, 1954, Serial No. 466,914

1 Claim. (Cl. 137—356)

The present invention relates to a simple, practical and expedient device which is aptly and expressly designed for incorporation in a sewer line between a septic tank and a leaching bed and the purpose of the invention is to eliminate the guesswork which is now relied upon in respect to determining whether or not a septic tank in a home-type sewage system calls for and needs cleaning.

It is a matter of common knowledge that persons familiar with and engaged in the business of installing and servicing septic tanks strongly recommend, and for good reason, that a septic tank must be cleaned often. This service involves an operation which calls for experienced help and special equipment. A service call for septic cleaning accomplishments will cost the home owner a minimum of $20.00 a call and on up. Manifestly, if a septic tank is allowed to become either inactive or full or the owner allows the sewage to run through the sewage line to the leaching bed, the latter naturally becomes fouled and will fail to absorb water as originally intended or required. Replacement of a leaching bed is relatively expensive, costs upward of $125.00 and involves inconvenience, laborious effort and time. It follows that there has long existed the problem of what should, under these circumstances, be worked out and effectually done.

It is the objective in the instant matter to solve the problem and this is herein done through the medium of a handy and reliable inspecting device, one which is handily installed in the sewer line between the septic tank and leaching bed and which embodies means providing a conduit with a lid or cover and which may be opened at intervals of two or three months so that the flow through the line may be checked and inspected. To this end, when the observer or inspector finds the flow, by way of the inspection device, clear water, nothing need be done. If such is not the case, the septic tank is, of course, ready for emptying by the service truck, but not before.

Other objects, features and advantages will become more readily apparent from the following description and the accompanying sheet of illustrative drawings.

In the drawings wherein like numerals are employed to designate like parts throughout the views.

Figure 1:
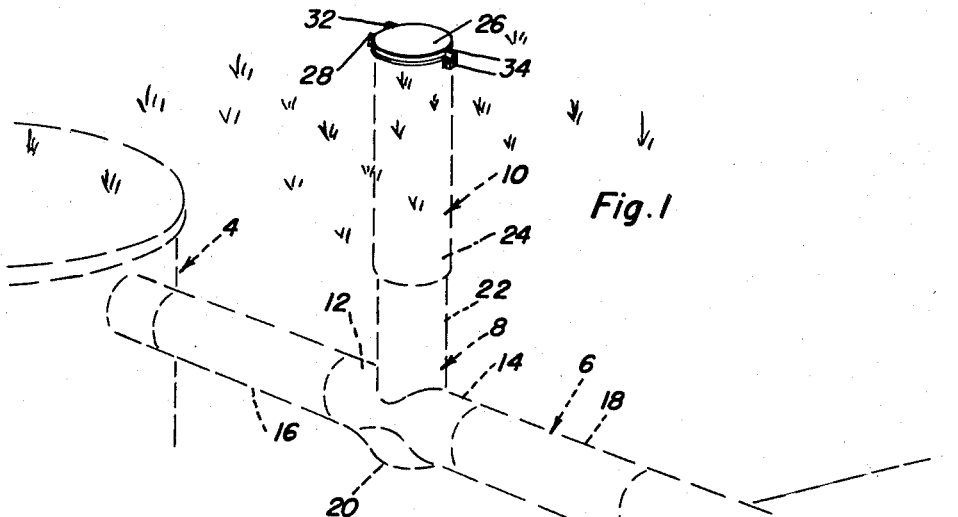
Figure 1 is a perspective view in phantom lines showing the septic tank at the left, the sewage line leading to the leaching bed (not shown) and the periodically usable lidded inspecting device incorporated or installed in said line.
Figure 2:
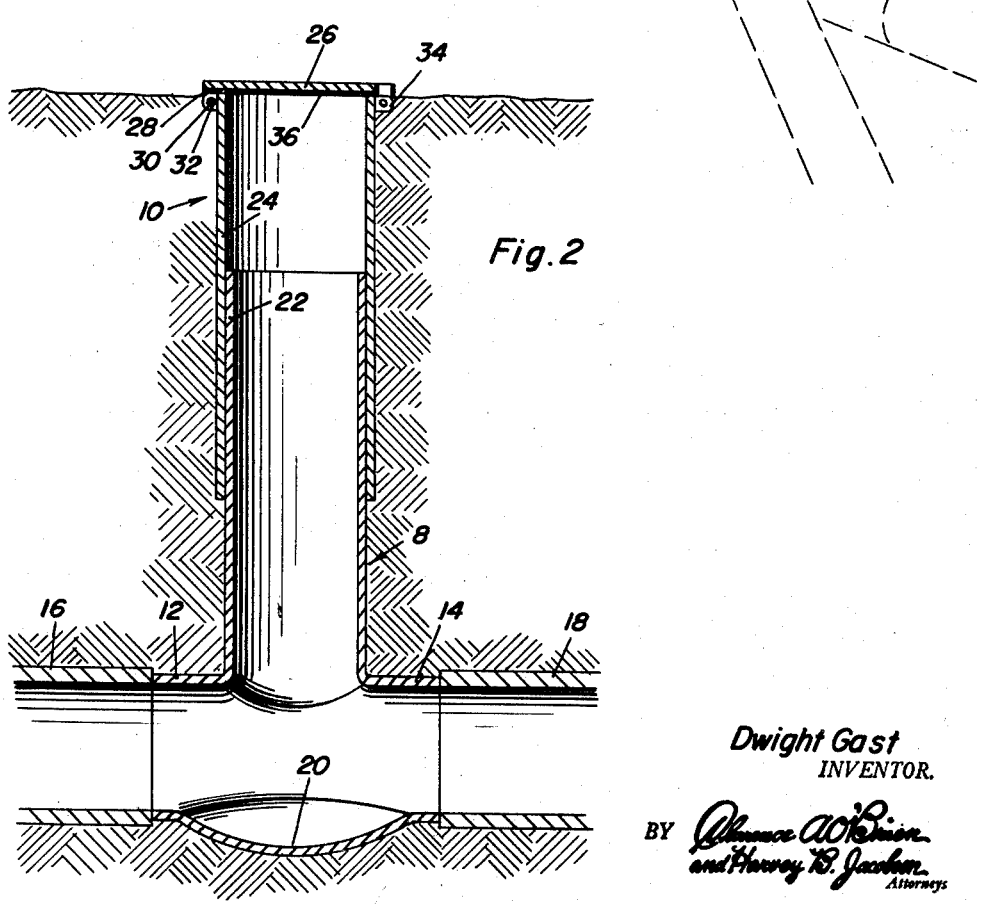
Figure 2 is a view on a larger scale with the parts appearing in section.

With reference to Figure 1, the numeral 4 designates a septic tank which, of course, may be of any recommended construction. The sewer pipe or sewage line, as it is called, is denoted generally by the numeral 6. The handy inspecting device is characterized by two components or parts the major one of which is an inverted T-shaped tile 8 of appropriate material. The companion part is a lidded pipe section generally denoted by the numeral 10. The T-shaped unit comprises what may be described as an open ended horizontal branch, the end portions of which are denoted by the numerals 12 and 14 and which are adapted to be lined up with complemental tiles 16 and 18 embodied in the aforementioned sewage line. The parts 16 and 18 may be suitably joined with 14 in any appropriate manner. The bottom of the central portion of the branch just referred to is of concavo-convex formation, that is, includes a sump-like depression or so-called basin 20 in which water and excreta may be trapped or pooled while passing on through the line 6. Communicatively attached to the center of the top half of the horizontal branch in focal alignment with said basin is a vertical branch 22 of any appropriate height. The tubular complemental section or pipe 24 is telescopically connected therewith so as to provide what may be called a vertically adjustable or extensible and retractible stack. This has also been referred to as the inspection conduit and is vertically adjustable. The cover or lid is of any suitable construction and is denoted by the numeral 26 and has lugs 28 hinged to complemental lugs 30 as at 32 and is provided on the diametrically opposite side with additional lugs cooperating with a complemental lug 34 to accommodate the shackle of a padlock (not shown). The numeral 36 designates an appropriate gasket between the lid or cover and the upper edge of the pipe section 24. Thus, the two members or pipe sections 22 and 24 provide the lidded extensible and retractible inspection conduit. In practice the interior surface of the horizontal branch will be painted white or otherwise finished in a correspondingly light color to render the inspection operation more reliable and vivid.

If the sewer system is being installed new, the inspection device may be installed where an ordinary soft tile would otherwise be fitted or installed. It can be made in sizes to match the tile to be used. The same holds true for the sewage systems already installed. The upright stack is adjustable so that the lidded upper end may be flush with the surface of the ground, a range of eighteen inches to about thirty-five inches. The device is to be made of appropriate lasting material and experience has shown that its adoption and use will save the owner many times its cost in a relatively short period of time.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

For installation in a sewer line between a septic tank and a leaching bed, a periodically usable inspection device comprising a T-shaped tile embodying a horizontal branch which is open at its opposite ends and is adapted to be installed in the sewer line between adjacent cooperating and communicating tiles in said sewer line, and a vertical viewing and inspecting branch at right angles to and communicatively joined with the top portion of the horizontal branch between the respective ends of said horizontal branch, the entire interior surfaces of said horizontal branch being coated with light reflecting paint which greatly assists one in better seeing the central part of the bottom portion of the horizontal branch in a manner to expedite making the aforementioned periodical inspection, said central part of said bottom being formed into a concavo-convex depression functioning as a water trapping and pooling sump in vertical alignment with said vertical branch, said sump being of an areal extent in plan which is greater than the cross-section of said vertical branch, and a vertical pipe telescopically mounted on said vertical branch and providing an adjustable extension therefor and adapted to have its upper end extended to a position level with the ground surface, and readily accessible cover means mounted on the upper end of said extension pipe.

References Cited in the file of this patent

UNITED STATES PATENTS

| | | |
|---|---|---|
| 620,588 | Hoppes | Mar. 7, 1899 |
| 908,980 | Eagan | Jan. 5, 1909 |
| 965,008 | Perkins | July 19, 1910 |
| 977,740 | Higgins | Dec. 6, 1910 |
| 1,004,436 | Kehr | Sept. 26, 1911 |
| 1,216,051 | Bayley | Feb. 13, 1917 |
| 1,633,080 | Engle | June 21, 1927 |
| 2,078,047 | Zingone | Apr. 20, 1937 |
| 2,457,418 | Turpin | Dec. 28, 1948 |
| 2,506,206 | Fulton | May 2, 1950 |